United States Patent
Armesto et al.

(10) Patent No.: US 9,784,226 B2
(45) Date of Patent: Oct. 10, 2017

(54) VEHICLE FUEL DELIVERY SYSTEM

(71) Applicant: Ford Global Technologies, LLC, Dearborn, MI (US)

(72) Inventors: Carlos Armesto, Canton, MI (US); Shiguang "Steven" Zhou, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 13/762,356

(22) Filed: Feb. 7, 2013

(65) Prior Publication Data

US 2014/0216404 A1    Aug. 7, 2014

(51) Int. Cl.
*F02M 37/00* (2006.01)
*F02M 31/20* (2006.01)

(52) U.S. Cl.
CPC ........ *F02M 37/0052* (2013.01); *F02M 31/20* (2013.01); *Y02T 10/126* (2013.01); *Y10T 29/49229* (2015.01)

(58) Field of Classification Search
CPC .. F02M 31/20; F02M 37/0052; F02M 69/462; Y10T 29/49229
USPC ...................... 123/445; 29/888; 165/177, 182
See application file for complete search history.

(56) References Cited

U.S. PATENT DOCUMENTS

| | | | |
|---|---|---|---|
| 5,611,392 A * | 3/1997 | Malecek | F01P 3/20 123/142.5 R |
| 6,216,675 B1 * | 4/2001 | Bennett | B60K 15/03006 123/514 |
| 6,250,328 B1 | 6/2001 | Distelhoff et al. | |
| 6,457,460 B1 | 10/2002 | Doane et al. | |
| 6,626,162 B2 * | 9/2003 | Shelor | F02D 33/003 123/541 |
| 6,868,838 B2 | 3/2005 | Piet | |
| 7,685,819 B2 * | 3/2010 | Vetrovec | F02B 29/0412 123/540 |
| 7,859,845 B2 | 12/2010 | Ullman et al. | |
| 8,006,675 B2 | 8/2011 | Chyo et al. | |
| 8,671,678 B2 * | 3/2014 | Ostlund | F03G 7/06 60/527 |
| 2005/0193993 A1 | 9/2005 | Dale | |
| 2006/0169252 A1 * | 8/2006 | Ludwig | F02M 37/106 123/447 |
| 2011/0120131 A1 * | 5/2011 | Ostlund | F03G 7/06 60/670 |
| 2012/0227926 A1 * | 9/2012 | Field | F24D 11/003 165/10 |
| 2012/0241122 A1 * | 9/2012 | Xiang | C09K 5/063 165/10 |
| 2014/0216404 A1 * | 8/2014 | Armesto | F02M 69/462 123/445 |

* cited by examiner

*Primary Examiner* — Jacob Amick
(74) *Attorney, Agent, or Firm* — James Dottavio; McCoy Russell LLP

(57) ABSTRACT

A vehicle fuel delivery system, includes: a first line configured to deliver fuel from a fuel tank to an internal combustion engine (ICE); a second line configured to return fuel from the ICE to the tank or the first line; a heat exchanger in thermal communication with the second line; and a latent material in the heat exchanger configured to change from a solid state to a liquid state when fuel in the second line reaches a predetermined temperature.

19 Claims, 4 Drawing Sheets

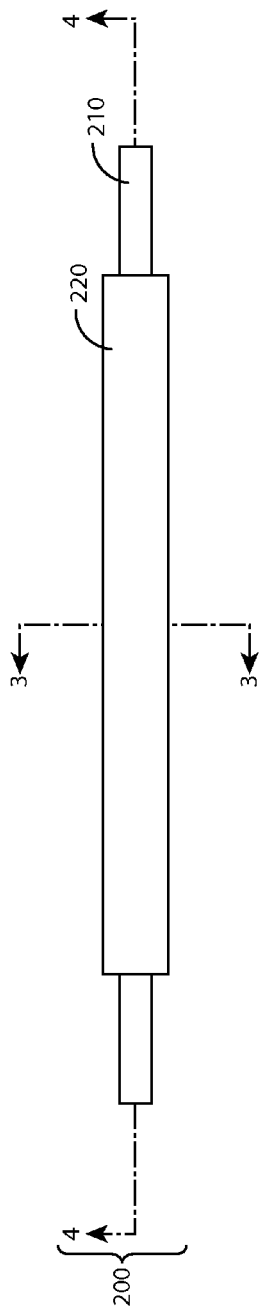
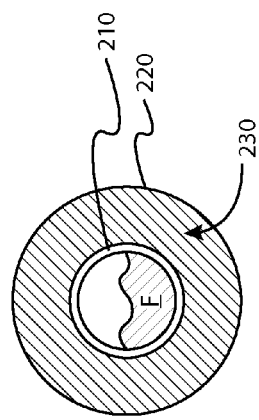
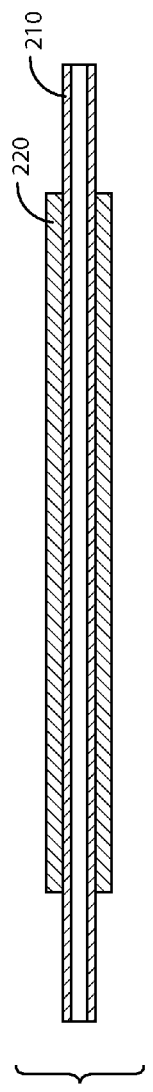
FIG. 2
FIG. 3
FIG. 4

VEHICLE FUEL DELIVERY SYSTEM

TECHNICAL FIELD

The present disclosure relates to vehicle fuel delivery systems, particularly for recycling fuel delivery systems.

BACKGROUND

Diesel internal combustion engines can return fuel to a fuel tank. Returning fuel can have higher temperatures than fuel in or leaving the tank. In which case it can be desirable to cool fuel re-entering the fuel tank. Traditionally, this is done by using air fans, coolant or heat exchangers. Because these systems require additional parts, these systems can add unnecessary weight, expense and complexity to the fuel line assembly. Additionally, controls are typically needed to regulate these systems in order to avoid cooling or heating the fuel when doing so is not needed.

For example, U.S. Pat. No. 6,626,162 titled "Diesel Fuel Recycling System and Apparatus to Reduce Vapor Emissions of Diesel Fuel" discusses a recycling fuel delivery system that selectively routes fuel from a heat exchanger to the vehicle fuel tank or delivery line. This system, however, uses a heat exchanger incorporated with the vehicle heating, ventilation, and air conditioning system. Controls are used to regulate the heat exchanger; moreover, because the system is intertwined with the vehicle HVAC, HVAC performance can be compromised when fuel is being cooled.

Therefore it is desirable to have a lower cost and less complex system of supplying cooling on-demand to a return fuel line for an internal combustion engine.

SUMMARY

The present disclosure addresses one or more of the above-mentioned issues. Other features and/or advantages will become apparent from the description which follows.

One advantage of the present disclosure is that lower cost and less complex systems for supplying cooling on-demand to a return fuel line for an internal combustion engine are disclosed herewith. The examples of the present disclosure provide simpler, more flexible solutions than traditional cooling options for the fuel line. The solutions do not require separate components or regulation of a cooling medium. Therefore, packaging space for the fuel line assembly is also reduced substantially.

One exemplary embodiment of the present disclosure relates to a vehicle fuel delivery system, having: a first line configured to deliver fuel from a fuel tank to an internal combustion engine (ICE); a second line configured to return fuel from the ICE to the tank or the first line; a heat exchanger in thermal communication with the second line; and a latent material in the heat exchanger configured to change from a solid state to a liquid state when fuel in the second line reaches a predetermined temperature.

Another exemplary embodiment of the present disclosure relates to a method of manufacturing a vehicle fuel delivery system, the method including: providing a fuel line configured to return fuel from an internal combustion engine (ICE); and incorporating a latent material in a heat exchanger in thermal communication with the fuel line. The latent material is configured to change from a solid state to a liquid state when fuel in the second line reaches a predetermined temperature.

Another exemplary embodiment of the present disclosure relates to a vehicle fuel line assembly, having: a fuel line; and a latent material in thermal communication with the fuel line. The latent material is configured to change from a solid state to a liquid state when fuel in the second line reaches a predetermined temperature.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

BRIEF DESCRIPTION OF THE DRAWINGS

FIG. 2 is a side view of a fuel line assembly from the fuel delivery system of FIG. 1.

FIG. 3 is a cross-sectional view of the fuel line assembly of FIG. 2 at line 3-3.

FIG. 4 is a cross-sectional view of the fuel line assembly of FIG. 2 at line 4-4.

DETAILED DESCRIPTION

Figure 1:
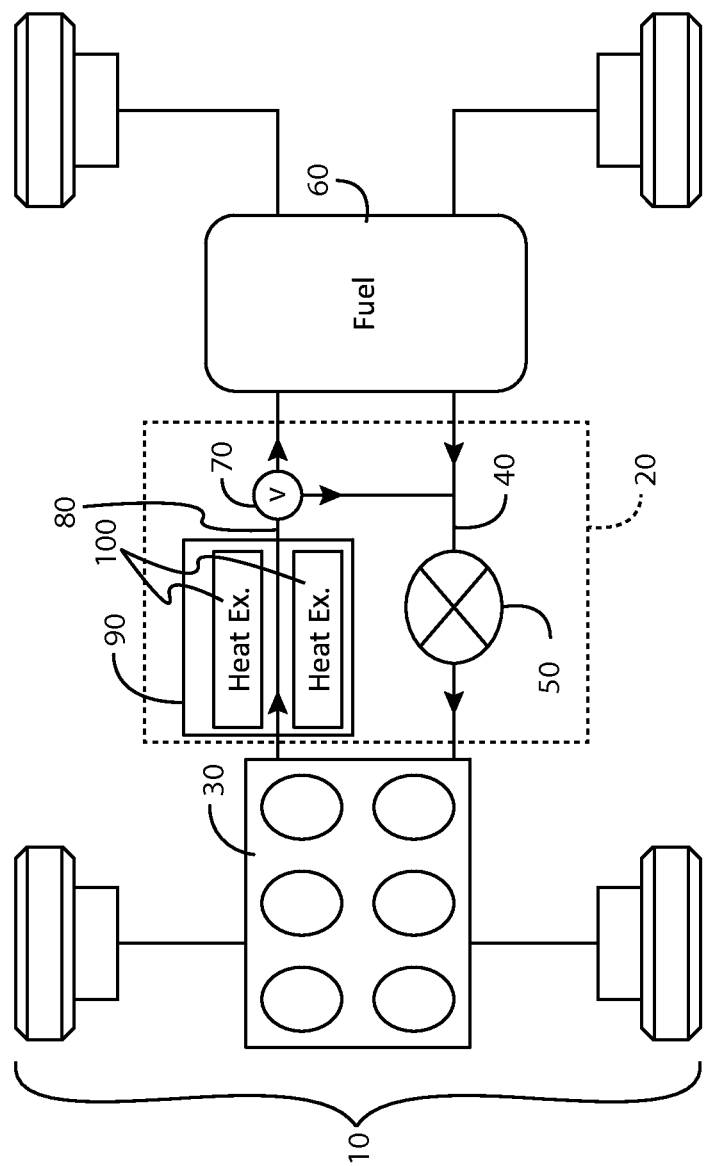
FIG. 1 is schematic top view of a vehicle with a fuel delivery system according to one embodiment of the present disclosure.

Referring to the drawings, wherein like characters represent examples of the same or corresponding parts throughout the several views, there are shown exemplary, fuel delivery systems for use with a vehicle having an internal combustion engine (or "ICE"). The disclosed fuel delivery systems include alternative heat exchangers in thermal communication with a fuel line or hose. Heat exchangers do not require controllers or separate parts. Heat exchangers have a latent material therein. Latent material is configured to change a state (or phase) at a designated temperature. The state change results in heat loss from the fuel line. Generally speaking, the exemplary latent materials in the illustrated heat exchangers are designed to change from a solid state to a liquid state when fuel in the return line reaches a predetermined temperature. Different latent materials are disclosed as examples.

The disclosed fuel delivery systems can be used with any type of engine or powertrain, including diesel engines or hybrid systems with power lines running to electric motors or fuel cells.

Turning now to FIG. 1, there is shown therein a top view of a vehicle 10 schematic having a fuel delivery assembly (or system) 20. The vehicle 10 is a four-wheeled vehicle. A six-cylinder ICE 30 is included in the vehicle 10. A delivery line 40 includes a pump 50 to supply fuel to the ICE 30. Vehicle 10 has a fuel tank 60 mounted at a rear of the vehicle. A valve 70 is included in a return line 80 for the fuel delivery system 20 that governs whether fuel is returned to the tank 60 or delivery line 40. With the shown delivery assembly, fuel is recycled from the ICE 30 back to the fuel delivery line 40 or in the alternative to a fuel tank 60.

Return fuel line assembly 90 includes a heat exchanger 100 that surrounds fuel line 80, as shown in FIG. 1. Heat exchanger 100 is in thermal communication with the return fuel line 80. Heat exchanger 100 abuts fuel line 80.

With reference to FIGS. 2-4, there is shown therein a fuel line assembly 200 compatible with the vehicle 10 of FIG. 1. Assembly 200 is a fuel return line assembly. A side view of the fuel line assembly 200 is shown. Assembly 200 includes a fuel hose 210 (or line), encased by a heat exchanger 220. Heat exchanger 220 is journaled onto the fuel line 210. Heat exchanger 220 is a passive heat exchanger having latent material 230 therein configured to create heat transfer between the fuel line and the exchanger.

Latent material 230, as shown in FIGS. 3-4, is configured to change from a solid state to a liquid state when the fuel, F, and/or fuel line 210 reaches a predetermined temperature. When fuel line 210 is sufficiently cooled below the predetermined material, latent material 230 returns to a solid state. In this embodiment, the predetermined temperature is approximately 100 degrees F. Predetermined temperature can be a maximum temperature for the fuel or just below a maximum temperature for the fuel. Latent material 230 can be, for example, plastic, phosphorus, gallium, francium, cesium, rubidium, potassium, sodium, mercury or other composite materials.

Figures 5, 6:
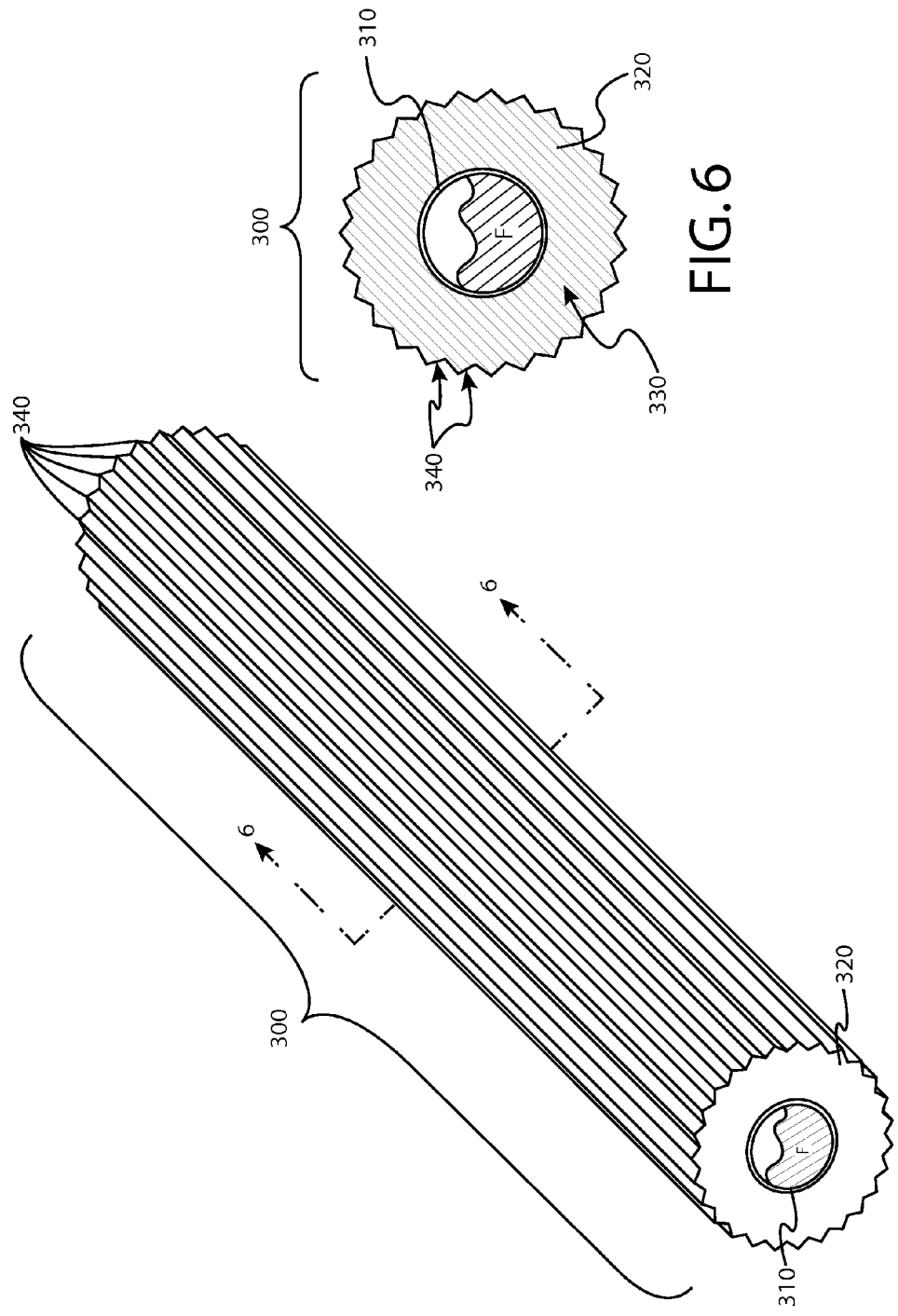
FIG. 5 is a perspective view of a fuel line assembly according to another exemplary embodiment of the present disclosure.
FIG. 6 is a cross-sectional view of the fuel line assembly of FIG. 5.

Now turning to FIGS. 5-6, there is shown therein another fuel line assembly 300. A perspective view of the fuel line assembly 300 is shown. Assembly 300 is a return line assembly. Assembly 300 includes a fuel hose 310 (or line), encased by a heat exchanger 320. Heat exchanger 320 is journaled onto the fuel line 310. Heat exchanger 320 is a passive heat exchanger having latent material therein. Latent material 330 is configured to change from a solid state to a liquid state when the fuel, F, and/or fuel line reaches a predetermined temperature. In this embodiment, the predetermined temperature is approximately 90 degrees F. Heat exchanger 320 is configured with fins 340 on an exterior surface of heat exchanger. Fins 340 provide additional surface cooling for the heat exchanger 320.

Figure 7:
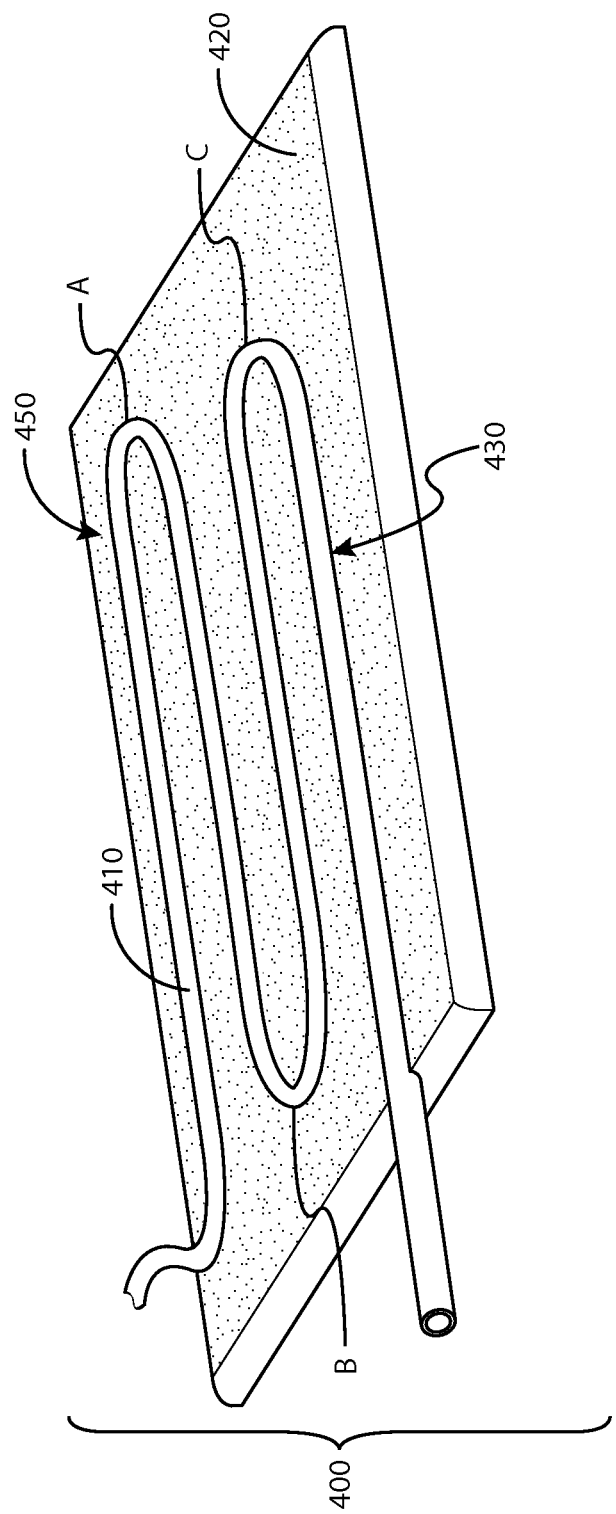
FIG. 7 is a perspective cross-sectional view of a fuel line assembly according to another exemplary embodiment of the present disclosure.

Turning now to FIG. 7, there is shown therein another exemplary embodiment of a vehicle fuel line assembly 400. A perspective view of the fuel line assembly 400 is shown. Assembly 400 is a return line assembly. Assembly 400 includes a fuel hose 410 (or line) encased by a heat exchanger 420. Heat exchanger 420 is a housing containing a labyrinth 430 formed therein. A bottom half of the heat exchanger housing is shown. Labyrinth 430 is defined by a contorted groove formed in housing. Labyrinth 430 in this embodiment includes several curves or bends shown as A, B and C in FIG. 7. In other embodiments, labyrinth 430 is of different configurations. Fewer or more curves can be formed in housing.

Heat exchanger 420 is a passive heat exchanger having latent material therein. Latent material 450 is configured to change from a solid state to a liquid state when the fuel and/or fuel line reaches a predetermined temperature. In this embodiment, the predetermined temperature is approximately 110 degrees F.

Other heat exchanger designs can be incorporated with the fuel delivery system to cool a fuel line. Convection or other cooling techniques can be used including radiation. Heat exchanger can also be incorporated onto any fuel line. For example, in arrangements where a return fuel line is configured to return fuel to a delivery line, delivery line can include a heat exchanger having latent material therein.

A method of manufacturing a vehicle fuel delivery system, such as those shown in the exemplary embodiments of FIGS. 2-7, can include the following steps. One embodiment of the method includes: providing a fuel line configured to return fuel from an internal combustion engine (ICE); and incorporating a latent material in a heat exchanger in thermal communication with the fuel line, for example as shown in FIGS. 2-7. The latent material is configured to change from a solid state to a liquid state when fuel in the second line reaches a predetermined temperature. Heat exchangers can be formed, for example, with a molding process, such as injection molding. In the illustrated embodiments, heat exchangers are hollowed shells filled with latent material. The method can include journaling the heat exchanger around a portion of the fuel line, for example as shown in FIGS. 2-6. One embodiment of the method of manufacture also includes forming fins on an exterior surface of the heat exchanger and distributing the latent material throughout the fins. An example of this is shown in FIGS. 5-6.

In another example, the method of manufacture includes forming a labyrinth in the heat exchanger; and routing the fuel line through the labyrinth. An example of the same is shown and discussed with respect to FIG. 7.

Those familiar with the art to which this invention relates will recognize various alternative designs and embodiments for practicing the invention within the scope of the appended claims.

We claim:

1. A vehicle fuel delivery system, comprising:
   a first line configured to deliver fuel from a fuel tank to an internal combustion engine (ICE);
   a second line configured to return fuel from the ICE to the fuel tank;
   a heat exchanger which abuts a portion of the second line and is in thermal communication with the second line;
   a third line configured to deliver fuel from the second line, downstream of the heat exchanger, to the first line; and
   a latent material in the heat exchanger configured to change from a solid state to a liquid state when fuel in the second line reaches a predetermined temperature,
   wherein the heat exchanger is a passive heat exchanger, and
   wherein the heat exchanger is journaled onto and around the portion of the second line.

2. The fuel delivery system of claim 1, wherein the fuel delivery system is positioned in a vehicle having the ICE.

3. The fuel delivery system of claim 2, wherein the heat exchanger has fins on an exterior surface.

4. The fuel delivery system of claim 3, wherein the heat exchanger comprises fins, the fins comprising the latent material.

5. The fuel delivery system of claim 1, wherein the heat exchanger is substantially cylindrical in shape, the second line passing through a central axis of the heat exchanger, and wherein the heat exchanger has fins extending axially along an exterior surface of the heat exchanger.

6. The fuel delivery system of claim 5, wherein the latent material is distributed throughout an interior of one or more fins of the heat exchanger.

7. The fuel delivery system of claim 1, wherein the heat exchanger has a housing configured to encapsulate the portion of the second line, and further comprising a valve downstream of the heat exchanger, the valve configured to divert the fuel from the second line to the third line.

8. The fuel delivery system of claim 7, wherein the housing includes a labyrinth into which the second line is fitted.

9. A vehicle fuel line assembly, comprising:
   a fuel line; and a latent material which abuts a portion of the fuel line and is in thermal communication with the fuel line;

wherein the latent material is substantially cylindrical in shape and is journaled onto and around the portion of the fuel line, the fuel line passing through a central axis of the latent material, wherein the latent material is configured to change from a solid state to a liquid state when fuel in the fuel line reaches a predetermined temperature, and wherein the latent material forms fins extending axially along an exterior surface of the latent material.

10. The fuel line assembly of claim 9, comprising:

a housing having the latent material therein, into which the portion of the fuel line is fitted, a first line delivering fuel from a fuel tank to an engine, a second line delivering fuel from the fuel line to the first line, and a third line delivering fuel from the fuel line to the fuel tank.

11. The fuel delivery system of claim 1, wherein the predetermined temperature is between 90-110 degrees F.

12. The fuel line assembly of claim 10, wherein the fins extend radially outward from the fuel line, and further comprising a valve interposing the fuel line, the second line and the third line.

13. The fuel line assembly of claim 12, wherein the latent material within the housing forms a passive heat exchanger, and wherein the valve is operable to deliver fuel from the fuel line to either the second or third lines.

14. A vehicle system, comprising:

a vehicle fuel return system having:
  a fuel return line, and
  a heat exchanger which abuts a portion of the fuel return line, wherein
    the fuel return line is in thermal communication with the heat exchanger,
    the heat exchanger is a passive heat exchanger,
    the heat exchanger includes a latent material configured to change from a solid state to a liquid state when fuel in the fuel return line reaches a predetermined temperature,
    the latent material is substantially cylindrical in shape, the latent material and the fuel return line sharing a common central axis,
    the latent material is journaled onto and around the portion of the fuel return line, and
    the latent material forms fins on an exterior surface of the heat exchanger.

15. The system of claim 14, wherein the fins extend radially outward from the portion of the fuel return line.

16. The system of claim 15, wherein the fuel return line is configured to return fuel to a fuel tank, and wherein the fins extend axially along the heat exchanger.

17. The system of claim 15, wherein the fuel return line is configured to return fuel to a fuel delivery line, the system further comprising a second fuel return line configured to return fuel to the fuel tank, and a valve disposed in the fuel return line and operatively interposing the heat exchanger and the fuel delivery line, the valve further being coupled to the second fuel return line, and the valve being configured to selectively deliver fuel to either the fuel tank or the fuel delivery line.

18. The fuel delivery system of claim 1, wherein the second line is a fuel hose.

19. The fuel delivery system of claim 18, wherein the heat exchanger is a hollowed shell filled with the latent material, and wherein the hollowed shell abuts the fuel hose.

* * * * *